Figure 2:
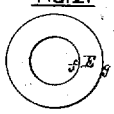
Figure 3:
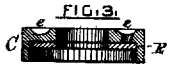
Figure 4:
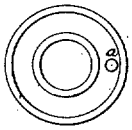

MOSES P. WILMARTH.

Improvement in Lubricating Bolster for Spinning Machines.

No. 4,666. Reissued Dec. 12, 1871.

WITNESSES.

John D. Thurston

Peter F. Hughes

INVENTOR.

Moses P. Wilmarth per B. F. Thurston

Atty.

THE NORRIS PETERS CO., PHOTO-LITHO., WASHINGTON, D. C.

UNITED STATES PATENT OFFICE.

MOSES P. WILMARTH, OF NORTH PROVIDENCE, R. I., ASSIGNOR TO ALVIN F. JENKS, STEPHEN A. JENKS, JOHN R. FALES, AND FRANCIS J. RABBETH.

IMPROVEMENT IN LUBRICATING BOLSTERS FOR SPINNING-MACHINES.

Specification forming part of Letters Patent No. 39,190, dated July 7, 1863; reissue No. 4,666, dated December 12, 1871.

*To all whom it may concern:*

Be it known that I, MOSES P. WILMARTH, of North Providence, (formerly of Smithfield,) in the county of Providence and State of Rhode Island, have invented a new and useful Improvement in Self-Lubricating Bolster for Spindles; and I do hereby declare that the following specification, taken in connection with the drawing making a part of the same, is a full, clear, and exact description thereof.

Figure 1:
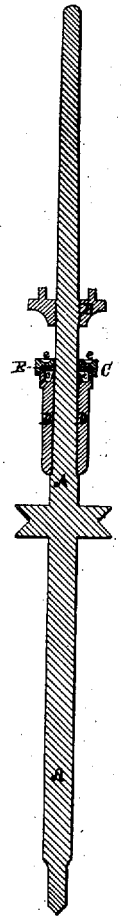
Figure 5:
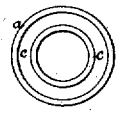

Figure 1 is a longitudinal section in a plane through the axis of the spindle and bolster. Figs. 2, 3, 4, 5, and 6 are detailed parts, to be referred to hereafter.

Figure 6:
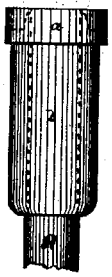

In the accompanying drawing, A, Fig. 1, represents a spindle, and D D the bolster within which the spindle runs. The upper end of the bolster D is made with an annular recess or chamber, *c*, concentric with the bearing in the bolster. The office of this recess is to hold a supply of oil to be used for lubricating the spindle, and as there is no duct leading from the bottom of the recess to the spindle-bearing, as in many bolsters of previous construction, the oil can reach the spindle only by being conveyed over the edge of the inner wall of the annular chamber *c*, which should be made tapering toward the top, as shown at Figs. 1 and 6. E is a disk of some fibrous material, as, for instance, woolen cloth, having a central hole to accommodate the spindle. This disk may be so arranged that its outer edge *g*, Fig. 2, shall rest on the bottom of the recess *c*, and its inner edge *f* be in contact with the spindle; or it may be arranged to cover the annular chamber *c*, as shown at Fig. 1. In the former case, the oil will be conducted to the spindle partly by the capillary attraction of the fibers of the absorbent E and partly by the tendency which a film of viscous fluid has when in contact with a rapidly-revolving spindle to draw after it a larger body of the same fluid with which it is connected. Under the arrangement of the disk E, shown in Fig. 1, the fibrous material serves principally to prevent any excess of flow of oil from the chamber, and more equally distributes it about the bearing of the spindle. For the purpose of protecting the absorbent E and the oil-chamber *c* from dust I prefer to cover the bolster with a cap, C, Figs. 1 and 3. This cap has upon its upper surface a concave channel, *e*, in which is an aperture, *o*, Fig. 4, through which oil poured into the channel of the cap will find its way to the absorbent E and to the channel *c*.

I do not claim regulating the supply of oil or other lubricating material to a bearing by means of the capillary attraction of fibrous matters; neither do I claim a bolster furnished with an annular recess around the spindle-bearing, and with ducts to convey the oil to the bearing; in combination with an absorbent to check the flow of the oil through the ducts, as this latter is shown in the patent granted to E. N. Steere January 21, 1862; but—

What I do claim as my invention, and desire to secure by Letters Patent, is—

1. A close-bottom oil-chamber, *c*, with a tapering inner wall formed in the head of a bolster, D, in combination with a spindle-bearing, substantially as described.

2. The combination of the above-described oil-chamber *c*, the fibrous absorbent E, and the spindle-bearing, substantially as specified.

3. The combination of the cap C, the absorbent E, the oil-chamber *c*, and spindle-bearing, substantially as described.

MOSES P. WILMARTH.

Witnesses:
A. J. CUSHING,
PETER F. HUGHES.